United States Patent [19]

Reid

[11] Patent Number: 4,619,978

[45] Date of Patent: Oct. 28, 1986

[54] SUBSTITUTED PHENOL CHAIN TERMINATOR FOR POLYVINYL CHLORIDE POLYMERIZATION

[75] Inventor: William J. Reid, New Fairfield, Conn.

[73] Assignee: Ciba-Geigy Corporation, Ardsley, N.Y.

[21] Appl. No.: 418,518

[22] Filed: Sep. 16, 1982

Related U.S. Application Data

[62] Division of Ser. No. 280,389, Jul. 6, 1981, abandoned.

[51] Int. Cl.[4] .......................... C08F 2/42; C08F 114/06
[52] U.S. Cl. ...................................... 526/84; 526/210; 526/211; 526/212; 526/344
[58] Field of Search .................. 526/84, 212, 210, 344

[56] References Cited

U.S. PATENT DOCUMENTS 3,225,108 12/1965 Sturgis ................................ 526/209
3,502,629 3/1970 Matthews ............................ 526/75
3,926,910 12/1975 Mowdood ........................... 526/83
4,401,798 8/1983 Ceprini et al. ...................... 526/84

Primary Examiner—Harry Wong, Jr.
Attorney, Agent, or Firm—Harry Falber

[57] ABSTRACT

An improved process for terminating the suspension polymerization reaction of vinyl chloride monomer into polyvinyl chloride which comprises adding hindered phenols of the structure presented hereinafter to the polymerization reaction at a point in time when a predetermined amount of monomer conversion has occurred.

1 Claim, No Drawings

SUBSTITUTED PHENOL CHAIN TERMINATOR FOR POLYVINYL CHLORIDE POLYMERIZATION

This is a division of application Ser. No. 280,389 filed on July 6, 1981, now abandoned.

The basic process of vinyl polymerization involves the addition of a vinyl monomer to a growing polymer chain. The polymerization is conducted at the proper temperature under pressure in the presence of an initiator. The polymer chain continues to grow in length until it is terminated by some means.

With regard to vinyl chloride polymerization, the overwhelming amount of polyvinyl chloride is prepared by suspension polymerization. In this process, the vinyl chloride monomer and an initiator are dispersed by agitation into a water phase at proper temperature and pressure. Suspending agents such as methyl or ethyl cellulose, gelatin, polyvinyl alcohol or other water-soluble polymers are utilized to stabilize the suspension during the polymerization reaction. The fine granules of polymer in the form of a slurry are discharged from the reactor and centrifuged or filtered to remove the water. Thorough washing and drying of the polymer to remove traces of the suspension stabilizer and the reaction medium conclude the procedure.

Toward the end of the polymerization cycle the pressure in the system begins to drop, followed very shortly by a peak in the polymerization rate. Beyond the peak, the rate begins to drop sharply and the polymer beads become less porous as the free monomer is absorbed into the polymer. Such change in the particle character, both in terms of porosity and particle size distribution, is disadvantageous to the manufacturer in terms of reduced performance and economy of production. Thus, the crenulated porous surface is desired for enhanced plasticizer uptake to form dry blends for various extruding or calendaring operations. In order to avoid such adverse effects, the manufacturer will terminate the polymerization reaction prior to complete monomer conversion. The experience of the manufacturer will best determine the point at which polymerization is terminated to give high quality polymer, although 70 to 90% conversion reflects a general termination point.

Various techniques have been adopted for terminating polymerization. A purely mechanical approach has involved discharging the polymer slurry into an evacuated stripper tank and quickly reducing the temperature and pressure to effectively stop polymerization.

Various chemical approaches have also been adopted. The numerous conventional chemical means for terminating vinyl polymerization reactions are detailed in chemical texts and publications. More recent approaches have involved adding terminating agents or chain terminators to halt free radical propagation, removing unreacted monomer and processing the converted slurry to obtain the dry polyvinyl chloride. Thus, compounds such as α-methyl styrene, bisphenol A and various hindered phenol antioxidants have been added to the reactant mix at a pre-determined point for purposes of chain termination. Among these compounds, 2,6-di-tert-butyl-4-methylphenol, i.e. BHT, has been most frequently utilized as a chain terminator by addition to the polymerization system at the desired termination point. Various other hindered phenols having tertiary butyl substituents in the 2- and 6-positions on the benzene ring have also been used for this purpose. The performance results have, however, been less than desirable with these hindered phenols, these materials having little effect when added in concentrations up to about 250 ppm. BHT has also exhibited this limitation in being unable to provide effective chain termination at the lower, more desirable concentration ranges.

A further PVC chain termination composition based on hindered phenols is disclosed in U.S. Pat. No. 4,229,598. This composition is prepared by the alkylation of a fractionation cut from the product of vapor phase methylation of phenol. The fraction that is alkylated is a specific mixture of cresylic acids resulting in a corresponding mixture of simple methyl-t-butyl phenols. These mixtures are necessarily prepared, however, by rather complex and demanding procedures.

It is therefore the primary object of this invention to modify vinyl chloride suspension polymerization reactions so as to increase the efficiency of the chain termination step.

It is another object to define a class of additives which when added to the polymerization system provides the above noted increased effectiveness.

It is still another object to define the parameters of this improved polymerization procedure.

Various other objects and advantages of this invention will be readily apparent from the following detailed description thereof.

It has been surprisingly found that effectiveness of chain termination in vinyl chloride suspension polymerizations can be significantly increased by the addition of a class of hindered phenols having a methyl group on or associated with the phenyl ring, and preferably in the ortho- or meta-position on the ring, to the polymerization reaction systems at a point in time when a designated amount of monomer has been converted. Thus, the presence of the methyl group, preferably as a substitute for one of the tertiary butyl groups generally shielding the phenolic group in the prior art materials, results in an immediate termination of the polymerization reaction. In this manner, rapid chain termination is effected thereby facilitating the production of high quality polyvinyl chloride in high yields. These results are achieved without any significant modification of the suspension polymerization reaction and without any concurrent adverse effects. These chain terminators perform substantially better than the prior art materials in providing rapid and total chain termination and in providing these improved performance characteristics at significantly reduced concentration levels. Since these phenolic materials are recognized antioxidants and heat stabilizers for polymeric systems, their addition to the polymerization reaction effectively stops free radical propagation while correspondingly providing high levels of stability to the resulting polyvinyl chloride. In addition, approximately 90–95% of the chain stopper remains in the resin after stripping and/or drying, thereby effectively eliminating contamination of the recovered monomer. In contrast, lower molecular weight materials such as BHT can be expected to come off with the excess monomer in the gaseous stream so as to contaminate the monomer and therefore inhibit any polymerization reaction wherein the recycled monomer is utilized.

The chain terminators applicable for use in the process of this invention correspond to the formulae $$RX-(C_aH_{2a})-Q \qquad (I)$$

wherein
R is

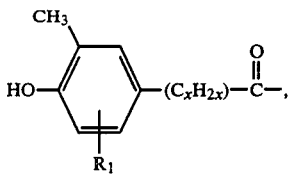

X is oxygen or sulfur,
a is an integer from 6 to 30,
x is an integer from 0 to 5,
$R_1$ is alkyl of from 1 to 8 carbon atoms,
Q is hydrogen or —A—$(C_yH_{2y})$—$R_2$,
A is oxygen, sulfur,

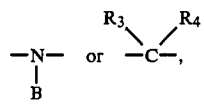

Y is an integer from 0 to 20,
B is lower alkyl or lower alkanoyl,
$R_2$ is hydrogen, hydroxy, lower alkanoyloxy or

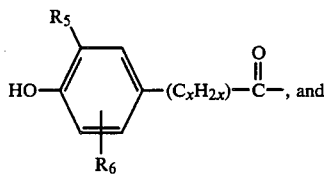

$R_3$, $R_4$, $R_5$ and $R_6$ independently are alkyl from 1 to 8 carbon atoms;

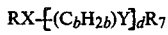 (II)

wherein
R and X are as previously defined,
b is an integer from 2 to 6,
d is an integer from 3 to 40
Y is oxygen or sulfur, and
$R_7$ is hydrogen, lower alkyl or

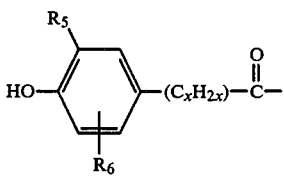

with $R_5$, $R_6$ and x being as previously defined;

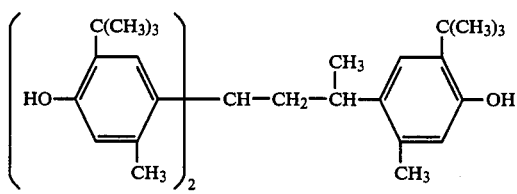 (III)

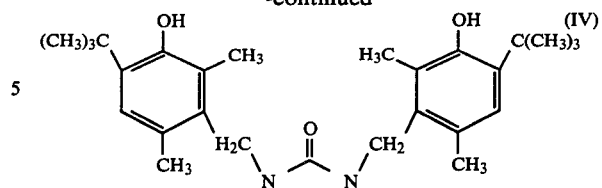 (IV)

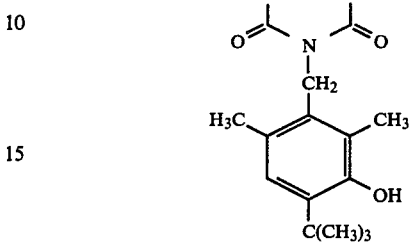

or

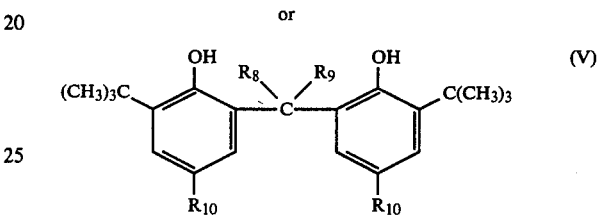 (V)

wherein $R_8$ and $R_9$ independently are hydrogen or lower alkyl, and $R_{10}$ is lower alkyl.

Compounds of formula I which are preferred exhibit X as oxygen, x as 0 to 2, $R_1$ as alkyl of from 1 to 4 carbon atoms, A as oxygen, y as 0 to 2, $R_2$ as hydrogen or the indicated phenol and $R_5$ and $R_6$ as alkyl of from 1 to 4 carbon atoms. Particularly preferred are those compounds wherein $R_1$ and $R_6$ are tert. butyl positioned in the ortho-position, $R_5$ is methyl and x is 2. Specific compounds of preference are octadecyl 3-(3'-methyl-5'-tert.butyl-4'-hydroxyphenyl)propionate and 1,6-hexamethylene bis-(3-methyl-5-tert.butyl-4-hydroxyhydrocinnamate).

Compounds of formla II which are preferred exhibit X and Y as oxygen, x as 0 to 2, $R_1$ as alkyl of from 1 to 4 carbon atoms, b as 2, d as 3 to 20, $R_7$ as the indicated phenol and $R_5$ and $R_6$ as alkyl of from 1 to 4 carbon atoms. Particularly preferred are those compounds wherein $R_1$ and $R_6$ are tert.butyl positioned in the ortho-position and $R_5$ is methyl. A specific compound of preference is triethylene glycol bis-(3-methyl-5-tert.butyl-4-hydroxyphenyl)propionate.

Compounds of formula V which are preferred exhibit $R_8$ and $R_9$ as hydrogen or methyl and $R_{10}$ as methyl or tertiary butyl. Specific compounds of preference are bis-(2-hydroxy-3-tert.butyl-5-methylphenyl)methane and 1,1-bis-(2-hydroxy-3,5-di-tert.butylphenyl)ethane.

Methods for preparing these hindered phenols are well known to those skilled in the art. Specific reference is made to U.S. Pat. Nos. 3,285,855, 3,944,594 and 4,032,562 for information regarding the phenols of formulae I and II and their methods of preparation. In general, they are prepared from the appropriate acids, acid chlorides or lower alkyl esters and alcohols or thio alcohols utilizing well-known esterification or transesterification methods. The compound of formula III is TOPANOL CA available from ICI Corp., while the compound of formula IV is CYANOX 1790 available from American Cyanamid Co. Compounds falling within formula V include CYANOX 2246 from American Cyanamid Co. and ISONOX 129 from Schenectady Chemical.

As previously noted, these hindered phenols are known for their antioxidant activity in a variety of polymeric substances including polyvinyl chloride. When added to such polymers for purposes of this area of utility, they are generally added to the final polymeric product.

Vinyl chloride suspension polymerization techniques are likewise well-known to those skilled in the art. Such techniques are described in detail in most basic polymer chemistry texts such, for example, as W. Sorenson, "Preparative Methods of Polymer Chemistry", Second Ed., Interscience Publishers, N.Y. (1968). In general, the reactor is charged with the appropriate amounts of suspending agent, initiator and emulsifier in the aqueous reaction system. Typical suspending agents include methyl or ethyl cellulose, gelatin, polyvinyl alcohol or other water soluble polymers, while typical initiators include peroxydicarbonate, benzoyl peroxide, lauroyl peroxide, t-butylperbenzoate, acetyl peroxide, cumene hydroperoxide, di-t-butyl peroxide, and the like. The emulsifier is generally added to enhance the porosity of the polymer particles. This charge is generally added to the reactor at ambient temperature. The vinyl chloride monomer is then introduced, agitation is initiated and the reactor is heated to the polymerization range of from 45° to 60° C. The pressure will be in the range of from about 140–150 psig for the 5-7 hour reaction period necessary to achieve about 70% monomer conversion, with the residual monomer being recovered for possible future use. Filtration, washing and drying complete the polymerization procedure.

In addition to the chemical structure of the instant chain terminators, effective termination is dependent upon the amount of compound added. For purposes of this invention, 25-5000 ppm of hindered phenol, based on the weight of the vinyl chloride monomer, added at the time of 0 to 95% monomer conversion will provide the desired benefits. Preferred values are 50-1000 ppm of hindered phenol added at 70 to 90% monomer conversion, while particularly preferred concentrations are 50-500 ppm of hindered phenol.

It is to be noted that the latter 70-90% range is the desired range for obtaining commercially acceptable yields of polymer. However, the instant hindered phenols will terminate the polymerization reaction at any stage thereof. Accordingly, the 0-95% range reflects the possibility of premature termination where emergency conditions, power outages, and the like, demand such early termination.

The rate of polymerization can be designated in terms of the time to the designated amount of conversion of the polymerization reaction and/or the amount of pressure drop after conversion, the latter being especially indicative of termination capability. In this context, "conversion" is designated as the point during polymerization when vinyl chloride monomer is no longer available as a free monomer and is absorbed into the polymer.

The compounds designated herein are seen to provide immediate termination of vinyl chloride polymerization reactions. This immediate termination allows for the production of high yields of high quality polyvinyl chloride. These compounds are also seen to provide such rapid termination at concentration levels substantially below that required for currently utilized materials. The compounds simultaneously provide antioxidant properties to the resulting polymeric product. Finally, the residual monomer is virtually uncontaminated by these compounds.

The following examples illustrate the preferred embodiments of the invention. In these examples, all parts given are by weight unless otherwise specified.

EXAMPLE 1

This example illustrates a typical suspension polymerization procedure.

| REAGENT | PARTS |
|---|---|
| Vinyl Chloride Monomer (VCM) | 100.00 |
| Initiator - Peroxydicarbonate | 0.04 |
| Suspending agent - Methocel type | 0.03 |
| NaOH | 0.10 |
| $H_2O$ (Deaerated Distilled) | 200.00 |
| Antioxidant | varies |
| Sodium Lauryl Sulfate | 0.02 |

A. Filling of Lecture Bottle with 250 g VCM

1. Evacuate air from lecture bottle and weigh.
2. Cool in freezer.
3. Place 1 gallon stainless steel cylinder filled with VCM in hot water bath (hot tap water).
4. Connect 1 gallon cylinder to 500 ml lecture bottle with flexible stainless steel hose and connectors.
5. Weigh 500 cc cylinder during addition and stop when approximate weight VCM registers on balance.
6. Weight 500 cc cylinder with no connections to determine exact amount of VCM inside.

B. Charging of Reactor

1. Carefully put thistle tube into reactor's entry port.
2. Add sodium lauryl sulfate through thistle tube.
3. Wash tube with 50 parts water.
4. Add suspending agent in 1% solution (aqueous).
5. Wash tube with 50 parts water.
6. Add NaOH in 1% solution (aqueous).
7. Wash tube with 50 parts water.
8. Add initiator in 7.5% solution (toluene).
9. Wash tube with rest of water.
10. Turn on pressure and temperature recorders.

C. Charging of Reactor with VCM

1. Heat 500 ml lecture bottle in hot water bath (hot tap water).
2. Connect lecture bottle through quick-connect fittings to reactor.
3. Open valves and VCM will flow in within 60 seconds.
4. Close off valves, start stirring motor at 500 rpm and start preheated (62° C.) circulating water bath through reactor outer jacket.

D. Reaction Notes

1. Agitate at 500 rpm and heat to reaction temperature of 57° C. within 30 minutes.
2. Typical reaction with peroxydicarbonate initiator achieved 57° C. reaction temperature and 140-150 psi reaction pressure approximately 30 minutes after initiating heating. The pressure remains in this range for approximately 5-7 hours or to about 70% conversion after which the pressure gradually drops.

E. Addition of Chain Stopper at 70% Conversion

1. Add desired amount chain stopper to a 40 cc lecture bottle.
2. Fill 40 cc lecture bottle with 20-30 g VCM as in Procedure A.
3. At 70% conversion connect lecture bottle to addition part of reactor and heat to 90°–100° C. with electric heat gun (check with pyrometer).
4. Open valves and VCM/chain stopper solution will flow in.
5. Close valves and reweigh lecture bottle to be sure all VCM/chain stopper solution went into reactor.

F. PVC Recovery

1. Vent unreacted VCM slowly into hood, opening and closing valve until no pressure is left in reactor.
2. When all VCM is vented, PVC discharged through bottom port into collection bottle.
3. Filter, then wash with 1000 ml distilled water.
4. Strip wet cake.

The following compounds were utilized in the polymerization procedures noted in the following examples.

| Compound | Structure |
|---|---|
| (A) | [HO—Ar(C(CH$_3$)$_3$)(CH$_3$)—(CH$_2$)$_2$COO(CH$_2$)$_2$OCH$_2$—]$_2$ |
| (B) | HO—Ar(C(CH$_3$)$_3$)(CH$_3$)—(CH$_2$)$_2$COOC$_{18}$H$_{37}$ |
| (C) | [HO—Ar(C(CH$_3$)$_3$)(CH$_3$)—(CH$_2$)$_2$COO(CH$_2$)$_3$—]$_2$ |
| (D) | (HO—Ar(C(CH$_3$)$_3$)(CH$_3$)—CH—CH$_2$—)$_2$CH—Ar(C(CH$_3$)$_3$)(CH$_3$)—OH |
| (E) | Tetra-substituted bis-imide with four (CH$_3$)$_3$C, CH$_3$, OH substituted benzyl groups on N atoms of a diketopiperazine ring |
| (F) | (CH$_3$)$_3$C—Ar(OH)(CH$_3$)—CH$_2$—Ar(OH)(CH$_3$)—C(CH$_3$)$_3$ |
| (G) | (CH$_3$)$_3$C—Ar(OH)(C(CH$_3$)$_3$)—CH(CH$_3$)—Ar(OH)(C(CH$_3$)$_3$)—C(CH$_3$)$_3$ |
| (1) | di-t.butyl version of A |
| (2) | di-t.butyl version of B |
| (3) | di-t.butyl version of C |
| (4) | [HO—Ar(C(CH$_3$)$_3$)$_2$—(CH$_2$)$_2$COOCH$_2$—]$_4$C |
| (5) | [HO—Ar(C(CH$_3$)$_3$)$_2$—(CH$_2$)$_2$COOCH$_2$—]$_2$C(CH$_3$)$_2$ |
| (6) | HO—Ar(C(CH$_3$)$_3$)$_2$—CH$_3$ (BHT) |

EXAMPLE 2

This example compares the termination effectiveness of a compound of the instant invention with that of a commercial compound presently being utilized as a chain terminator in polyvinyl chloride suspension polymerizations.

The polymerization procedure of Example 1 was utilized herein. In each reaction, the pressure after the terminator had been added and the pressure after a 15 hour reaction sequence were noted. These values were determined by continuous monitoring of the pressure in the reactor. Small pressure drops after the addition of the terminator are indicative of effective termination. The following results were obtained:

| Compound | Concentration (ppm) | Pressure* Drop after 15 hrs.(psi) | Pressure** Drop after 70% Conversion(psi) |
|---|---|---|---|
| A | 100 | 22 | 16 |
|   | 250 | 0 | 0 |
| 6 (BHT) | 250 | 18 | 15 |
|   | 500 | 18 | 10 |
|   | 1000 | 5 | <3 |

*Initial pressure minus the pressure at 15 hours.
**Pressure at 70% conversion minus the pressure at 15 hours.

Although the above noted data indicate effective chain termination by BHT at 1000 ppm, it is important to recognize that they likewise illustrate a further beneficial performance characteristic of the compound of this invention, namely, the ability to substantially duplicate the chain termination performance of commercial materials at concentration levels substantially below 1000 ppm.

EXAMPLE 3

The polymerization procedure of Example 1 and the monitoring procedure of Example 2 were again repeated with the compounds noted hereinbelow with the exception that the compounds were added at the initiation of the polymerization reaction. Although this approach does not reflect a commercially desirable procedure, it is satisfactory as a screening procedure in order to predict chain termination activity.

Thus, since it can be postulated that the rate of initiation in the polymerization reaction is related to the rate of termination, an additive which slows the rate of polymerization also effects the rate of termination. Accordingly, longer periods to pressure drop are indicative of more effective chain stoppers. Correspondingly, since pressure drop after conversion is indicative of continued reaction and a resultant adverse effect on the polyvinyl chloride, lower pressure drops are likewise indicative of more effective chain stoppers.

The resulting data are noted in the following table.

| Compound | Concentration (ppm) | Time to Pressure Drop (min.) | Pressure Drop after 900 min. (psi) |
|---|---|---|---|
| — | — | 365 | 60 |
| A | 100 | 540 | 24 |
|   | 250 | >900 | <6 |
| 1 | 100 | 450 | 33 |
|   | 250 | 465 | 27 |
| B | 100 | 480 | 30 |
| 2 | 100 | 380 | 46 |
|   | 250 | 380 | 41 |
| C | 100 | 570 | 22 |
| 3 | 250 | 405 | 36 |
| 4 | 100 | 375 | 50 |
|   | 250 | 360 | 41 |
| 5 | 250 | 375 | 39 |
| 6 | 250 | 420 | 21 |
|   | 500 | >900 | <6 |

When viewed in the context of the above noted discussion, these data clearly indicate that the chain terminators of the instant invention are surprisingly more effective in terminating the polymerization reaction than the corresponding hindered phenols having tertiary butyl groups in both ortho positions.

EXAMPLE 4

The following additional compounds reflecting hindered phenols of the instant invention and commercially available chain stoppers were subjected to the polymerization and monitoring procedures of Examples 1 and 2.

| Compound | Concentration (ppm) | Pressure Drop after 15 hrs. (psi) | Pressure Drop after 70% Conversion (psi) |
|---|---|---|---|
| D | 250 | 8 | 2 |
| E | 250 | 6 | 0 |
| F | 250 | 15 | 0 |
| G | 250 | 7 | 0 |
| α-methyl styrene | 250 | 6 | 0 |
| Bisphenol A | 250 | 31 | 26 |
| α-methyl styrene/6 | 290/570 | 0 | 0 |
| 2 | 250 | 35 | 30 |
| — | — | 45 | 45 |

As noted, the chain stoppers falling within the instant invention exhibit excellent performance characteristics.

EXAMPLE 5

This example illustrates a further benefit of the chain terminating agents of this invention as contrasted with a commercial product.

In order to determine the level of contamination of chain termination in the unreacted vinyl chloride monomer, several of the polyvinyl chloride products prepared in Examples 2 and 3 were analyzed for their terminator content by a gel permeation chromatographic technique. The following results were obtained:

| Compound | Initial Conc. of Terminator (ppm) | Terminator Conc. in PVC (ppm) |
|---|---|---|
| A | 100 | 95 |
|   | 250 | 245 |
| 2 | 250 | 235 |
| 6 | 500 | 250 |
|   | 1000 | 435 |

In contrasting terminator A of the instant invention with compound 6 (BHT), it is seen that a wide disparity exists in the amount of terminator retained in the polymer. Thus virtually all of A is found in the polymer, thereby providing virtually uncontaminated residual vinyl chloride monomer. In contrast, only about half of the BHT content is retained in the polymer, thereby suggesting the undesirable presence of significant amounts of BHT in the residual monomer.

In summary, this invention provides novel chain terminating agents for use in suspension polymerization of vinyl chloride monomer. Variations may be made in procedures, proportions and materials without departing from the scope of the invention as defined by the following claims.

What is claimed is:

1. In the process for the suspension polymerization of vinyl chloride monomer which comprises adding the monomer to an aqueous reaction system containing effective amounts of a suspending agent and a polymerization initiator, terminating the polymerization reaction and isolating the polyvinyl chloride, the improvement which comprises terminating the polymerization reaction by the addition to the reaction system at a point within the range of 70 to 95% monomer conversion of 25–5000 ppm, by weight of vinyl chloride monomer, of a compound corresponding to the formula

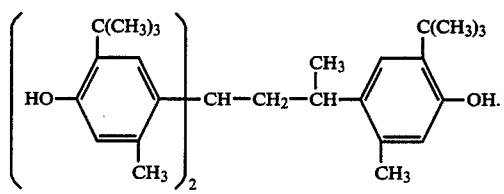

* * * * *